United States Patent
Rios et al.

(10) Patent No.: US 7,725,701 B2
(45) Date of Patent: May 25, 2010

(54) PORTABLE DEVICE COMPRISING A BIOS SETTING

(75) Inventors: Jennifer E. Rios, Houston, TX (US);
Valiuddin Y. Ali, Houston, TX (US);
Lan Wang, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 756 days.

(21) Appl. No.: 11/367,919

(22) Filed: Mar. 3, 2006

(65) Prior Publication Data

US 2007/0208928 A1 Sep. 6, 2007

(51) Int. Cl.
*G06F 15/177* (2006.01)
(52) U.S. Cl. .................. 713/1; 713/2; 713/100
(58) Field of Classification Search .......... 713/1, 713/2, 100
See application file for complete search history.

(56) References Cited

U.S. PATENT DOCUMENTS

| | | | | |
|---|---|---|---|---|
| 5,892,902 A * | 4/1999 | Clark | ...... | 726/5 |
| 6,198,996 B1 * | 3/2001 | Berstis | ...... | 701/36 |
| 6,353,885 B1 * | 3/2002 | Herzi et al. | ...... | 713/1 |
| 6,697,944 B1 | 2/2004 | Jones et al. | | |
| 6,765,470 B2 * | 7/2004 | Shinzaki | ...... | 340/5.52 |
| 6,920,553 B1 | 7/2005 | Poisner | | |
| 6,973,518 B2 * | 12/2005 | Purpura | ...... | 710/104 |
| 6,986,030 B2 * | 1/2006 | Shmueli et al. | ...... | 713/1 |
| 7,000,249 B2 * | 2/2006 | Lee | ...... | 726/20 |
| 7,036,738 B1 * | 5/2006 | Vanzini et al. | ...... | 235/486 |
| 7,117,369 B1 * | 10/2006 | Burns et al. | ...... | 713/182 |
| 7,272,549 B2 * | 9/2007 | Kortum et al. | ...... | 703/21 |
| 7,308,570 B2 * | 12/2007 | Young et al. | ...... | 713/2 |
| 7,549,161 B2 * | 6/2009 | Poo et al. | ...... | 726/5 |
| 2002/0099934 A1 | 7/2002 | Cromer et al. | | |
| 2002/0147912 A1 | 10/2002 | Shmueli et al. | | |
| 2002/0174353 A1 | 11/2002 | Lee | | |
| 2003/0110371 A1 | 6/2003 | Yang et al. | | |
| 2003/0145191 A1 | 7/2003 | Park | | |
| 2003/0184793 A1 | 10/2003 | Pineau | | |
| 2004/0001088 A1 | 1/2004 | Stancil et al. | | |
| 2005/0172137 A1 | 8/2005 | Hopkins | | |

FOREIGN PATENT DOCUMENTS

KR 1020050021699 A 3/2005

OTHER PUBLICATIONS

"About USB Smart Tokens and Smart Cards," Rainbow Technologies, 2001; last updated Dec. 4, 2001, 1 pp. [Online] http://www.rainbow.com/ikey/index.html.
"iKey 2000," Rainbow Technologies, 2001; last updated Nov. 28, 2001, 2 pp. [Online] http://www.rainbow.com/ikey2000.html.
[Online] http://www.thumbdrive.com/product_informationnew1.htm, 1 pp.

(Continued)

*Primary Examiner*—Nitin C Patel

(57) ABSTRACT

A portable device comprise non-volatile storage. The non-volatile storage comprises a basic input/output system (BIOS) setting. The BIOS setting is applied from the portable device onto a system to which the portable device can be coupled.

19 Claims, 2 Drawing Sheets

OTHER PUBLICATIONS

[Online] http://www.thumbdrive.com/specification.htm, 1 pp.
Product Info, Overview, 3 pp. [Online] http://www.diskonkey.com/product.asp?section=1.
Ed Frauenheim, "Desktop to go where Migo goes," Sep. 22, 2003, 3 pp. [Online] http://news.com.com/2100-1041-5080056.html.
"Migo by PowerHouse Technologies Group, Inc.," 3 pp. [Online] http://www.4migo.com/about/features.html.
PCT Search Report on PCT/US2007/002569; Jun. 21, 2007; 12 pp.
EP Oral Proceedings Summons dated Nov. 20, 2009, pp. 9.

* cited by examiner

PORTABLE DEVICE COMPRISING A BIOS SETTING

BACKGROUND

Computers typically comprise executable code referred to as the basic input/output system (BIOS) code. The BIOS code is executed to. initialize (boot-up) the computer as well as to provide various interfaces to low-level functions of the computer such as access to storage drives, interaction with input devices, etc. One or more settings are typically associated with a computer's BIOS. An example of such a setting is the enabling or disabling of or more of the computer's ports. Changing a computer's BIOS settings to suit a user's preferences can be time-consuming and cumbersome. Further, multiple users might desire to each have their customized set of BIOS settings. Storage space internal to the computer to store BIOS settings for multiple users is limited.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
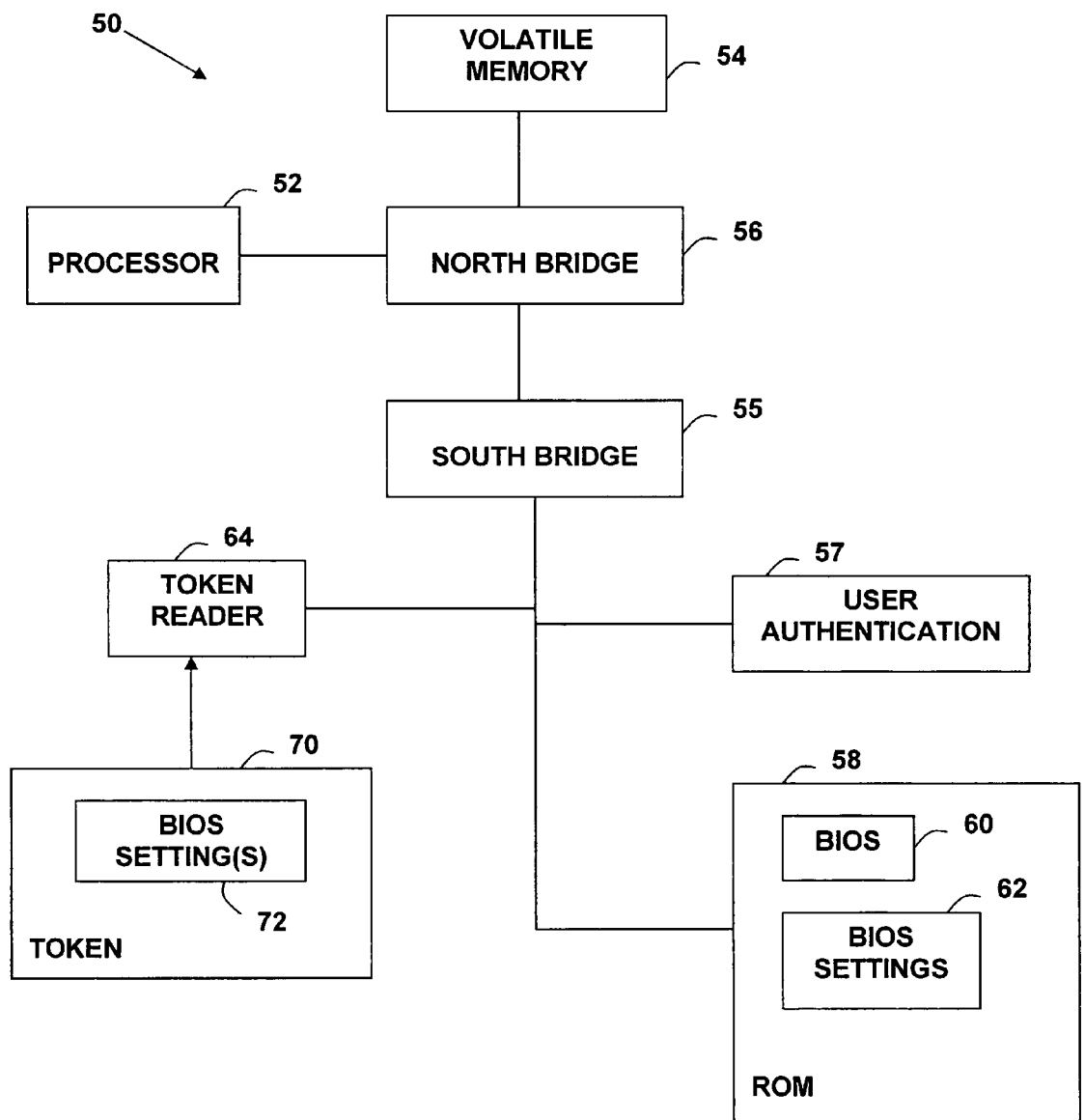
FIG. 1 shows a system in accordance with an embodiment of the invention.

FIG. 1 shows a system 50 in accordance with an embodiment of the invention. The system 50 shown in FIG. 1 may be representative of a wide variety of electronic systems. In accordance with at least one embodiment of the invention as will be discussed herein, at least one such system comprises a computer. As shown, computer 50 comprises a processor 52, volatile memory 54, north and south bridges 56 and 55, respectively, a user authentication device 57, non-volatile storage 58, and a token reader 64. In the embodiment of FIG. 1, the processor 52 and volatile memory 54 couple to the north bridge 56. The south bridge 55 couples to the north bridge 56 as well as to user authentication device 57, non-volatile storage 58, and token reader 64.

The non-volatile storage 58 may comprise in some embodiments, a read only memory (ROM). In this illustrated embodiment, ROM 58 comprises storage for a basic input/output system (BIOS) 60 and, as such, is referred to as a BIOS ROM. During initialization, the BIOS code 60 begins to execute from the BIOS ROM and is copied to the computer's volatile memory 54 for subsequent execution therefrom. At least a portion of the BIOS code 60 initializes the computer and causes the computer to transition to a fully operational state.

In the embodiment shown in FIG. 1, one or more BIOS settings 62 are also stored in the BIOS ROM 58. Such settings are used in connection with, or by, the BIOS code 60. Examples of the BIOS settings 62 comprise any one or more of an identity of a computer port to be enabled or disabled, a type of input device to be enabled, a security setting, a wireless communication setting, and a boot option (e.g., device boot order). When used, BIOS settings are used by the BIOS code 60.

In accordance with an embodiment of the invention, a portable token 70 can be inserted into the token reader 64. The token 70 may comprise any suitable type of portable storage device that can be coupled to, or decoupled from, the computer 50. Examples include a smart card and a universal serial bus (USB) storage device. The token reader 64 comprises an interface for the token 70 to the computer 50. In embodiments in which the token 70 comprises a smart card, the token reader 64 comprises a smart card reader. In embodiments in which the token 70 comprises a USB storage device, the token reader 64 comprises a USB port which, in turn, may comprise a USB controller. Further still, the token reader 64 in some embodiments is implemented as a biometric reader such as a fingerprint scanner. The token 70 has one or more BIOS settings 72 stored thereon (e.g., in non-volatile storage such as flash memory in or associated with the token 70).

Figure 2:
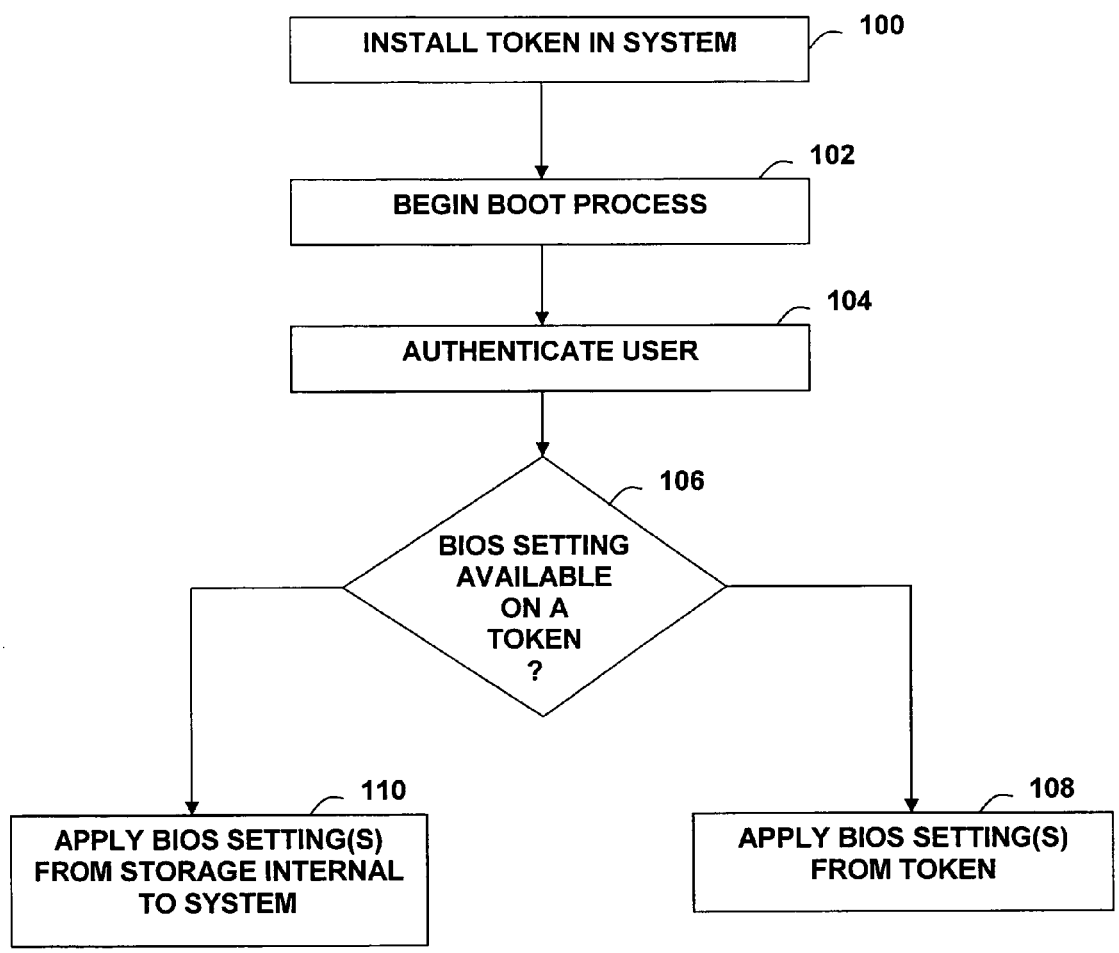
FIG. 2 shows a method in accordance with an embodiment of the invention.

FIG. 2 illustrates a method embodiment comprising actions 100-110. At 100, a user installs the token 70 in the computer 50. For example, in embodiments in which the token comprises a smart card, the smart card is inserted into a smart card reader associated with the computer. In embodiments in which the token 70 comprises a USB storage device, the token is connected to a USB port. At 102, the user causes the computer to begin booting (initializing) by, for example, pressing a power-on button. Some systems permit user authentication to be a feature that can be enabled and disabled, while in other systems whether a user is to be authenticated is not a feature that can be selectively enabled or disabled. If the computer has been configured to require a user to be authenticated before completing the boot process, at 104 the user is so authenticated. In some embodiments, this action is performed by the BIOS code 60. User authentication can be performed in a variety of ways. In one embodiment, the user authentication device 57 (FIG. 1) comprises an input device such as a keyboard and action 104 is performed by requiring the user to enter a correct password via the keyboard. In other embodiments, the user authentication device 57 comprises a biometric device such as a fingerprint or retinal scanner and the user is authenticated upon a successful biometric verification. In yet other embodiments such as those embodiments in which the token comprises a smart card, user authentication is stored on the token 70 and such information is used to authenticate the user. In other embodiments of the invention, user authentication, and thus action 104, is not performed.

If the user has been successfully authenticated in those embodiments in which user authentication is implemented, or if no user authentication is implemented, control passes to decision 106 at which a determination is made as to whether a token is installed in the system (per action 100) and, if so, whether the installed token comprises one or more BIOS settings. In some embodiments, the BIOS code 60 performs decision 106 by, for example, searching for a predetermined signature on a token 70. The signature may comprise a particular character string, bit string or a file name, or other suitable identifier of a BIOS setting. In at least some embodiments, the signature correlates the identity of the user to the BIOS setting(s) in accordance with any suitable technique. In one example, the signature includes a value that corresponds to a user-unique value (e.g., a password, fingerprint, etc.) that was used to authenticate the user as explained above. This correlation permits the BIOS setting(s) 72 on the token to be authenticated for the particular user of the token. Thus, in some embodiments, not only is the user authenticated, but the BIOS setting(s) 72 on the token is also authenticated to the user.

If no token has been installed in the computer or if a token has been installed, but the predetermined signature is not found, the BIOS code 60 determines that no BIOS setting is available on a token. In such a case, the BIOS settings are applied from storage internal onto the computer (action 110). Applying BIOS settings includes, in at least some embodiments, loading the settings into the BIOS 60 or otherwise making the settings available for use by the BIOS 60. The internal storage may comprise the BIOS ROM 58, which includes BIOS settings 62, or other suitable non-volatile storage (e.g., battery-backed RAM memory). If, however, the predetermined signature is found on a token 70, at 108 the BIOS settings are applied from the token 70 onto system 50. In the example of FIG. 2 and all other examples in this disclosure, the BIOS settings may comprise a single setting or multiple settings.

The embodiment of FIG. 2 and other embodiments discussed herein permit multiple users to easily provide their own customized BIOS settings to a computer. Further, a single user, such as a network administrator, can readily reconfigure each of a plurality of computers to perform, for example, a maintenance operation.

In the example of FIG. 2, the BIOS settings are loaded either from the token 70 (settings 72) or from storage internal to the computer (settings 62). In accordance with an alternative embodiment, BIOS settings may be loaded both from the token 70 and the computer's internal storage. For example, the token 70 may contain some, but not all, of the BIOS settings. Accordingly, those settings (or single setting) that are present on the token 70 are loaded into the computer and the remaining setting(s) are loaded from the computer's internal storage.

In accordance with yet another embodiment, the BIOS settings are loaded first from the computer's internal storage. Then, if a token 70 is installed in the computer and the token contains any BIOS settings, such token-based BIOS settings over-write whatever corresponding BIOS settings were loaded (applied) from the computer's internal storage. Thus, to the extent a token has any BIOS settings, such settings are given priority over the BIOS settings from the computer's internal storage. In this embodiment, the token 70 comprises all, or less than all, of the BIOS settings. Those BIOS settings loaded from the computer's internal storage that are not also present on the token 70 are, of course, not overwritten and remain intact as loaded from the internal storage.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A portable device, comprising:
   non-volatile storage in said portable device, said non-volatile storage comprising a basic input/output system (BIOS) setting;
   wherein, based on the BIOS setting being authenticated to a user, said BIOS setting is applied from said portable device onto an electronic system to which the portable device can be coupled, wherein said BIOS setting comprises at least one setting selected from a group consisting of an identity of a port to be enabled or disabled, a type of input device to be enabled, a security setting, a wireless communication setting, and a boot option.

2. The portable device of claim 1 further comprising user authentication information stored in said non-volatile storage.

3. The portable device of claim 2 wherein said setting also is not applied from said portable device onto said electronic system until after the user is successfully authenticated using said authentication information, if user authentication is required.

4. The portable device of claim 1 wherein said BIOS setting is applied from said portable device onto said electronic system while said electronic system is initializing.

5. The portable device of claim 1 wherein, when said BIOS setting is applied from said portable device onto said electronic system, said BIOS setting overwrites a corresponding BIOS setting previously loaded from storage internal to said electronic system.

6. The portable device of claim 1 wherein said non-volatile storage comprises a signature that correlates the user to the BIOS setting.

7. The portable device of claim 6 wherein the signature comprises at least one of a character string, a bit string, or a file name, and said signature comprises a value that corresponds to a user-unique value, said user-unique value comprising at least one of a password or a fingerprint template.

8. An electronic system, comprising:
   a processor;
   a basic input/output system (BIOS) comprising code executable by said processor; and
   wherein a BIOS setting is applied to said electronic system from a portable token accessible to said electronic system based on a said BIOS setting being authenticated to a user wherein said BIOS setting comprises at least one setting selected from a group consisting of an identity of a port to be enabled or disabled, a type of input device to be enabled, a security setting, a wireless communication setting, and a boot option.

9. The electronic system of claim 8 wherein said BIOS setting is not applied onto said electronic system until after a user associated with said token is successfully authenticated, if user authentication is required.

10. The electronic system of claim 8 wherein a BIOS setting from said portable token overwrites a BIOS setting that was loaded from storage internal to said electronic system.

11. The electronic system of claim 8 wherein at least one BIOS setting is applied from said portable token and at least one BIOS setting is loaded from storage internal to said electronic system.

12. A method, comprising:
   installing a portable token comprising a basic input/output system (BIOS) setting in an electronic system;
   beginning a boot process;
   authenticating a user;

determining if a portable token comprising a BIOS setting is installed in said electronic system;

authenticating said BIOS setting to a user; and applying said BIOS setting from said portable token onto said electronic system if said user is successfully authenticated and said BIOS setting is successfully authenticated to said user wherein installing said portable token comprising said BIOS setting comprises a setting selected from a group consisting of an identity of a port to be enabled or disabled, a type of input device to be enabled, a security setting, a wireless communication setting, or combination thereof.

13. The method of claim 12 wherein applying said BIOS setting comprises applying said BIOS setting from said portable token instead of from storage internal to said electronic system.

14. The method of claim 12 further comprising applying a BIOS setting from storage internal to said electronic system.

15. The method of claim 12 further comprising applying all BIOS settings onto said electronic system from storage internal to said electronic system.

16. The method of claim 15 wherein applying said BIOS setting from said portable token comprises changing a BIOS setting that had been applied from said internal storage.

17. The method of claim 12 wherein authenticating said BIOS setting to the user comprises determining whether the portable token contains a predetermined signature that contains a value unique to the user.

18. An electronic system, comprising:
means for receiving a portable token comprising a basic input/output system (BIOS) setting;
means for booting said electronic system;
means for authenticating a user;
means for determining if said token has been received into said electronic system;
means for authenticating the BIOS setting from the portable token to the user; and
means for applying said BIOS setting from said token on said electronic system based on the user being successfully authenticated and also based on the BIOS setting being successfully authenticated to the user, wherein said BIOS setting comprises at least one setting selected from a group consisting of an identity of a port to be enabled or disabled, a type of input device to be enabled, a security setting, a wireless communication setting, and a boot option.

19. The electronic system of claim 18 further comprising means for overwriting a previously applied BIOS setting.

* * * * *

UNITED STATES PATENT AND TRADEMARK OFFICE
CERTIFICATE OF CORRECTION

| | | |
|---|---|---|
| PATENT NO. | : 7,725,701 B2 | Page 1 of 1 |
| APPLICATION NO. | : 11/367919 | |
| DATED | : May 25, 2010 | |
| INVENTOR(S) | : Jennifer E. Rios et al. | |

It is certified that error appears in the above-identified patent and that said Letters Patent is hereby corrected as shown below:

In column 4, line 46, in Claim 8, delete "user" and insert -- user, --, therefor.

In column 5, line 8, in Claim 12, delete "user" and insert -- user, --, therefor.

Signed and Sealed this

Seventeenth Day of August, 2010

David J. Kappos
*Director of the United States Patent and Trademark Office*